US012097725B2

(12) United States Patent
Hensel

(10) Patent No.: US 12,097,725 B2
(45) Date of Patent: Sep. 24, 2024

(54) BOLT TOGETHER WHEEL WITH DEFLATION SYSTEM

(71) Applicant: OTR Wheel Engineering, Inc., Rome, GA (US)

(72) Inventor: Leonard Austin Hensel, Rome, GA (US)

(73) Assignee: OTR Wheel Engineering, Inc., Rome, GA (US)

( * ) Notice: Subject to any disclaimer, the term of this patent is extended or adjusted under 35 U.S.C. 154(b) by 441 days.

(21) Appl. No.: 17/600,561

(22) PCT Filed: Apr. 2, 2020

(86) PCT No.: PCT/US2020/026422
§ 371 (c)(1),
(2) Date: Sep. 30, 2021

(87) PCT Pub. No.: WO2020/206144
PCT Pub. Date: Oct. 8, 2020

(65) Prior Publication Data
US 2022/0176738 A1 Jun. 9, 2022

Related U.S. Application Data

(60) Provisional application No. 62/829,692, filed on Apr. 5, 2019.

(51) Int. Cl.
B60B 25/00 (2006.01)
B60B 25/22 (2006.01)
B60C 29/02 (2006.01)

(52) U.S. Cl.
CPC ............ *B60B 25/002* (2013.01); *B60B 25/22* (2013.01); *B60C 29/02* (2013.01); *B60B 2320/10* (2013.01);
(Continued)

(58) Field of Classification Search
CPC ... B60B 25/002; B60B 25/006; B60B 25/008; B60B 25/22; B60B 2900/5116; B60B 2900/3313; B60C 29/02
See application file for complete search history.

(56) References Cited

U.S. PATENT DOCUMENTS 4,196,765 A 4/1980 Heuer et al.
5,215,137 A 6/1993 Weeks
(Continued)

FOREIGN PATENT DOCUMENTS

CA 296675 A 1/1930
CA 2960705 A1 3/2016
(Continued)

OTHER PUBLICATIONS

Examination Search Report issued by Canadian Patent Office Dec. 8, 2021 for Canadian Patent Application No. 3,140,214, a foreign counterpart to U.S. Appl. No. 17/600,561 (5 pages).
(Continued)

*Primary Examiner* — Kip T Kotter
(74) *Attorney, Agent, or Firm* — Lee & Hayes, P.C.

(57) ABSTRACT

A bolt together wheel assembly with deflation system includes an inner wheel half, an outer wheel half, a bolt cover ring, and a removable valve stem. Clamping bolts and clamping nuts secure the outer wheel half to the inner wheel half. Venting port plugs secure the bolt cover ring to the outer wheel half over the clamping bolts. Loosening one or more of the venting port plugs to access the clamping bolts opens a seal to a vent port within the inner wheel half and releases pressurized air from a tire on the wheel, ensuring that the tire is deflated before the wheel can be disassembled.

16 Claims, 7 Drawing Sheets

(52) U.S. Cl.
CPC ............... *B60B 2900/3313* (2013.01); *B60B 2900/5116* (2013.01)

(56) References Cited

U.S. PATENT DOCUMENTS

| | | | |
|---|---|---|---|
| 7,779,877 | B2 | 8/2010 | Putz et al. |
| 8,505,598 | B2 | 8/2013 | Marsaly |
| 9,333,798 | B2 * | 5/2016 | Maeyama ............. B60B 25/002 |
| 9,821,600 | B2 * | 11/2017 | Kendricks ............. B60B 25/002 |
| 2005/0236081 | A1 * | 10/2005 | Marsaly ................ B60B 25/004 |
| | | | 152/396 |
| 2010/0024940 | A1 | 2/2010 | Hobe et al. |
| 2015/0273938 | A1 * | 10/2015 | Delayre ................ B60B 25/006 |
| | | | 301/95.11 |

FOREIGN PATENT DOCUMENTS

| | | |
|---|---|---|
| CA | 2974999 A1 | 8/2016 |
| CA | 3084494 A1 | 5/2017 |
| CA | 3011142 A1 | 1/2019 |
| CA | 3068480 A1 | 2/2019 |
| CA | 3049414 A1 | 1/2020 |
| CA | 3116872 A1 | 4/2020 |
| CA | 3127608 A1 | 7/2020 |
| CA | 3101806 A1 | 6/2021 |
| CN | 101031437 A | 9/2007 |
| CN | 104608571 A | 5/2015 |
| CN | 105539023 A | 5/2016 |
| EP | 2279881 | 2/2011 |
| GB | 1432545 | 4/1976 |

OTHER PUBLICATIONS

Notice of Granting Patent Right for Invention issued May 26, 2023 by the PRC National Intellectual Property Administration for corresponding Appln. No. CN 202080038837.9 (6 pages).

The PCT Search Report and Written Opinion mailed on Jul. 13, 2020 for PCT Application No. PCT/US2020/026422, 12 pages.

Office Action issued by the Indian Patent Office Aug. 28, 2023 for corresponding Indian Patent Application No. 202117044720, a foreign counterpart to U.S. Appl. No. 17/600,561 (16 pages).

The International Report on Preliminary Patentability in corresponding PCT Application No. PCT/US20/26422, mailed Oct. 14, 2021 (8 pages).

* cited by examiner

BOLT TOGETHER WHEEL WITH DEFLATION SYSTEM

CROSS-REFERENCE TO RELATED APPLICATION

This application is a U.S. national stage application under 35 U.S.C. § 371 of PCT International Application No. PCT/US2020/026422, filed Apr. 2, 2020, which claims the benefit of priority to U.S. Provisional Patent Application No. 62/829,692 entitled "Bolt Together Wheel with Deflation System," filed Apr. 5, 2019, which is expressly incorporated herein by reference in its entirety.

TECHNICAL FIELD

This disclosure relates to wheels for vehicles. More specifically, this disclosure concerns a wheel assembly with a two-piece bolt together wheel with a deflation system, particularly for industrial or heavy equipment vehicles.

BACKGROUND

Wheel assemblies for heavy equipment vehicles, such as mobile crane vehicles, often have different structures than wheel assemblies for typical passenger vehicles. For instance, rather than have a single wheel structure, wheel assemblies for heavy equipment vehicles often have major pieces, such as an inner half and an outer half, that are bolted together.

When a pneumatic tire is mounted under pressure on the wheel assembly, disassembly of the wheel can be dangerous. Release of pressurized air from the large tire during disassembly can violently force apart the wheel assembly. Rapid depressurization of the tire can even lead to an explosion of the wheel assembly.

Various approaches have attempted to minimize the risk of damage or harm to personnel in disassembling a multi-piece wheel under pressure. Typically, these approaches have found it advantageous to substantially deflate the tire before removal or disassembly of a wheel that has been bolted together. The wheels and wheel assemblies are particularly configured to cause or require deflation of the tire before disassembly of the wheel for removal of a tire from the wheel, reducing risk when disassembling the wheel assembly.

The manner of deflating a tire on a bolt-together wheel, and the wheel structure for accomplishing the deflation, can impact the usability of the wheel and the speed in which a tire may be removed or replaced. Existing approaches for bolt-together wheels, which may involve complicated sealing structures and require special tools, can inhibit rapid disassembly of the wheels, for instance, when changing tires.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
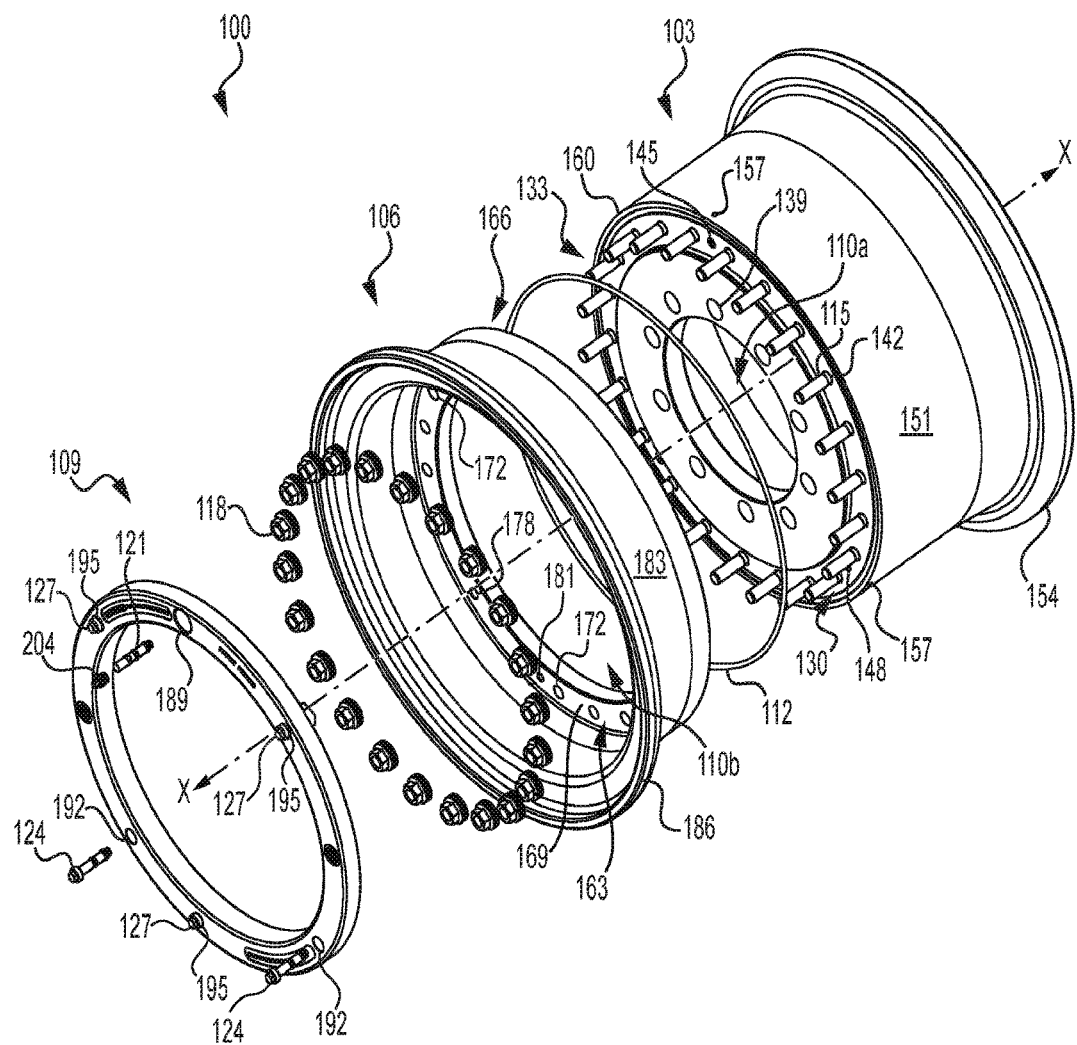
FIG. 1 illustrates an exploded view of the wheel assembly with a two-piece bolt together wheel with deflation system according to various embodiments of present disclosure.

Described below are various embodiments of the present systems and methods for a wheel and wheel assembly. Although particular embodiments are described, those embodiments are mere exemplary implementations of the system and method. One skilled in the art will recognize other embodiments are possible. All such embodiments are intended to fall within the scope of this disclosure. Moreover, all references cited herein are intended to be and are hereby incorporated by reference into this disclosure as if fully set forth herein. While the disclosure will now be described in reference to the above drawings, there is no intent to limit it to the embodiment or embodiments disclosed herein. On the contrary, the intent is to cover all alternatives, modifications and equivalents included within the spirit and scope of the disclosure.

Described herein is a wheel assembly with a two-piece bolt together wheel with a tire deflation system, for example for use with industrial vehicles such as mobile crane service vehicles, and the like. The wheel assembly can be a multi-piece assembly having an inner wheel portion or half and an outer wheel portion or half, with a bolt together configuration for receiving a tubeless tire mounted thereon. The wheel assembly is especially adapted for use with a pneumatic tire.

In any one or more embodiments and/or aspects described herein, the deflation system of the wheel assembly can include a bolt cover ring, a removable valve stem and associated channel(s) for introducing air, in particular pressurized air, into an inside chamber of a tire mounted on the wheel assembly to inflate the tire, and one or more venting port plugs configured to seal one or more vent channels associated with a respective venting port plug when the tire is inflated. The wheel assembly is configured to deflate the tire using the valve stem and/or upon removal of the one or more venting port plugs. The venting port plugs not only assist in sealing the air chamber within the tire. In one or more aspects the venting port plugs are configured to prohibit the removal of the bolt cover ring while the plugs are in place. In one or more other aspects the venting port plugs can be configured to secure the bolt cover ring to the outer wheel half. Separate clamping bolts and clamping nuts serve to secure the outer wheel half to the inner wheel half of the wheel assembly. In any one or more aspects, the venting port plugs do not serve to secure the outer wheel half to the inner wheel half. Moreover, the clamping bolts and the clamping nuts do not serve to secure the bolt cover ring to the outer wheel half.

Thus, the sealing feature of the air chamber within the tire provided by the valve stem and the venting port plugs can be independent of securing the outer wheel half to the inner wheel half by way of the clamping bolts and clamping nuts. The venting port plugs must be removed to remove the bolt cover ring. The bolt cover ring must be removed to provide access to the clamping nuts before the wheel assembly can be disassembled and the tire removed or replaced by removing the clamping nuts from the clamping bolts.

Thus, in the event that the tire has not been sufficiently deflated by way of the valve stem, before attempting to disassemble the wheel assembly and remove the tire, the one or more venting port plugs must be removed. Removing the one or more venting port plugs will cause the tire to deflate if any air remains within the tire. In various aspects herein, this has the advantage that the wheel assembly cannot be disassembled while there is still excess air pressure within the tire. Attempting to disassemble the wheel assembly while there is still excess air pressure within the tire can risk inadvertent expansion or separation of the wheel assembly.

In any one or more aspects herein, the wheel assembly includes at least an inner wheel half and an outer wheel half configured to be bolted together when mounting the tire. An inflation valve and channel(s) for the inflation valve are provided for inflation and deflation of the tire mounted on the wheel assembly. Additionally, one or more vent channels for the deflation system are formed including cross-vent channels in the inner and outer wheel halves including one or more venting ports extending axially along an axis X in the outer wheel half. The cross-vent channels of the inner and outer wheel halves are configured to align upon assembly of the two wheel halves such that one vent channel is provided with a valve stem seat in the inner wheel half for receiving a removable valve stem configured to facilitate inflation or deflation of the tire. Additionally, one or more vent channels are configured to facilitate deflation of the tubeless tire that are configured to receive one or more respective venting port plugs inserted through the outer wheel half into a seat in the inner wheel half.

The deflation system can be configured to ensure the tire is deflated before servicing the wheel and/or tire. The deflation system can include a bolt cover ring, a detachable valve stem, and one or more venting port plugs and associated channels in the inner and outer wheel halves. The bolt cover ring can be a single-piece or a multipiece ring configured with access holes in line with the venting channels.

In any one or more aspects, the access holes in the bolt cover ring are configured to allow the valve stem and the one or more venting port plugs to pass through the bolt cover ring and through the outer wheel half into and to be secured within respective seats within the inner wheel half. The valve stem and the one or more venting port plugs must be inserted into and secured within their respective seats within the inner wheel half to seal the air chamber of a tire mounted on the wheel assembly. The sealing of the air chamber of the tire can occur in the inner wheel half. The detachable valve stem can be secured to the inner wheel half, for example in a threaded seat, passing through a valve stem access hole in the bolt cover ring and through an axially extending cross-vent hole in the outer wheel half without attaching to either the bolt cover ring or the outer wheel half. Similarly, the one or more venting port plugs can be secured to the inner wheel half, for example in a threaded seat, passing through a venting port plug seat or access hole in the bolt cover ring and through an axially extending cross-vent hole in the outer wheel half without attaching to either the bolt cover ring or the outer wheel half.

In any one or more aspects, the inner wheel half can include vent ports extending radially outwardly from an axial direction X which ports connect the threaded seat in the cross-vent hole to the tire air chamber. Once the tire is inflated, air can be released from the tire by way of, or upon removal of, the detachable valve stem. Air can also be released from the tire upon removal of the one or more venting port plugs. Further, the venting port plugs must be removed to allow removal of the bolt cover ring to gain access to separate wheel clamping nuts to disassemble the wheel for service. The vent ports can be of sufficient size to vent air from the tire air chamber at a quick rate. For example, a radial venting port can be 7 mm in diameter or larger, depending on other features of the wheel design. In an embodiment, the inner wheel half can have three such radial venting ports each sealed by one of a detachable valve stem and two venting port plugs. However, additional venting can be provided by including more venting port plugs and associated cross-vent ports.

The valve stem and the one or more venting port plugs can each include an o-ring that provides a seal between the valve stem and a venting port plug and their respective seats in the inner wheel half. In any one or more aspects, the sealing o-ring is secured to a respective valve stem and/or a respective venting port plug. Additionally, the valve stem and the one or more venting port plugs can each comprise an annular soft spacer on the body of each valve stem and/or each venting port plug. In some embodiments, the annular soft spacer can be a second o-ring. The annular soft spacer can be configured for stabilization and/or to minimize dirt getting into the lower sealing or seating area. The cross-vent hole on the outer wheel half can be slightly larger than an associated annular soft spacer, which does not allow for an air-seal.

The bolt cover ring can be configured with a channel shape including boss elements, where the channel is configured to cover the clamping nuts, but not attach to the clamping bolts. The bolt cover ring can be configured to attach to outer wheel half by means of cap screws, which is a feature of the bosses in the bolt cover ring. In any one or more aspects, the cap screws do not connect to the inner wheel half. The cap screw seats can be configured in an asymmetrical manner such that there is only one way to attach the bolt cover ring to the outer wheel half.

Referring now in more detail to the drawings, in which like numerals indicate like parts through the several views, FIG. 1 illustrates an example of an exploded view of an embodiment of the present wheel assembly with a two-piece bolt together wheel with deflation system 100. The wheel assembly 100 can include an inner wheel half 103, an outer wheel half 106, a bolt cover ring 109, a primary o-ring 112 to provide a seal between the inner wheel half 103 and the outer wheel half 106, clamping bolts 115 and clamping nuts 118 for securing outer wheel half 106 to inner wheel half 103, a removable valve stem 121, one or more venting port plugs 124, and cap screws 127.

The inner wheel half 103 can comprise a first wheel disc 130 having a first seating surface 133. The first wheel disc 130 can comprise a center aperture 110a in an axial direction configured to receive a wheel hub of a vehicle (such as a mobile crane vehicle), a plurality of mounting holes 139 at a first radial position outwardly from a center longitudinal axis X surrounding the center aperture configured to receive mounting bolts of a wheel hub (not shown), a plurality of first clamping holes 142 at a second such radial position, a valve stem threaded seat 145, and at least one cross-vent threaded seat 148. A first wheel base portion 151 comprises a substantially cylindrical outer peripheral surface extending in an axial direction from the first wheel disc 130 to a peripheral edge forming a first annular rim 154 configured to mate to a bead rim of a tire, the first wheel base portion 151 including at least one vent port 157 formed or drilled extending radially outwardly from center longitudinal axis X through the outer peripheral cylindrical surface of the wheel base portion into the first wheel disc 130 and intersecting with the at least one cross-vent threaded seat 148 in the first wheel disc 130. In any one or more aspects, the inner wheel half 103 comprises an annular groove 160 disposed circumferentially about an annular edge of the first seating surface 133 of the first wheel disc 130. A primary o-ring 112 can be disposed within the annular groove 160 for providing an air seal between the inner wheel half 103 and an outer wheel half 106.

An outer wheel half 106 comprises a second wheel disc 163 having a second seating surface 166 configured to mate with the first seating surface 133 of the inner wheel half 103 and an opposing outer surface 169 configured to mate with a bolt cover ring 109, the second wheel disc 163 having a center aperture 110b configured to provide access clearance around the plurality of mounting holes 139 in the first wheel disc 130, a plurality of second clamping holes 172 configured to mate and correspond with the plurality of first wheel clamping bolts 115, a valve stem hole 175 configured to mate and correspond with the valve stem threaded seat 145, at least one cross-vent hole 178 configured to mate and correspond with the at least one cross-vent threaded seat 148 of the inner wheel half 103, and at least one cap screw threaded seat 181 formed in the outer surface 169 of the second disc 163 configured to mate with the bolt cover ring 109. A second outer peripheral wheel base portion 183 comprises a substantially cylindrical outer peripheral surface extending in the direction of axis X from the second wheel disc 163 to an outer annular rim 186. Outer second annular rim 186 is configured to mate with a bead rim of a tire opposite a bead rim of the tire mating with first annular rim 154.

Figure 2:
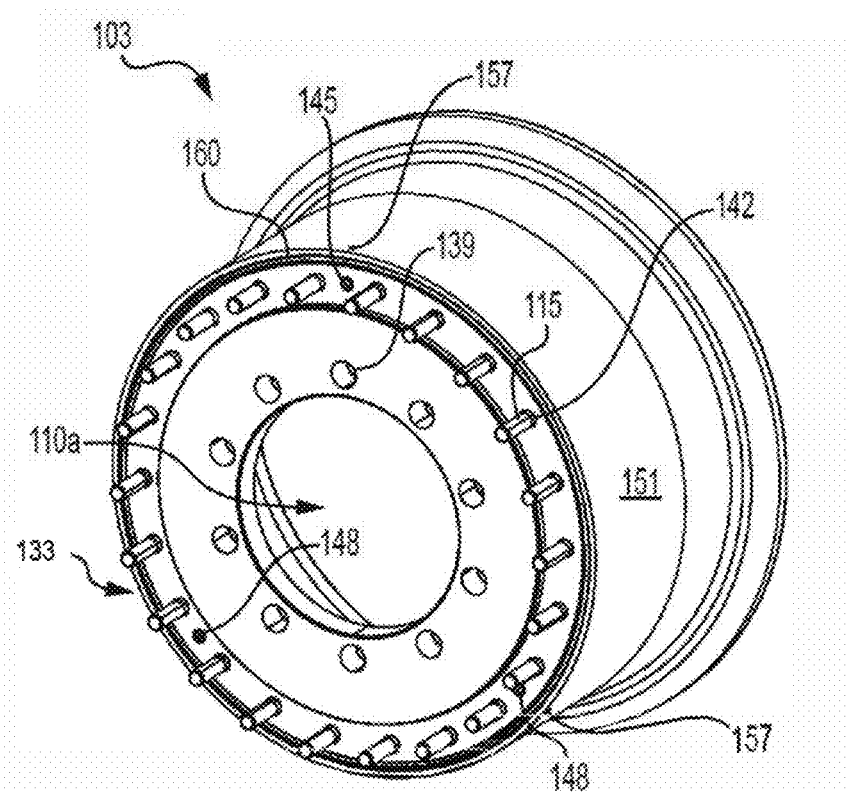
FIG. 2 illustrates an example of the inner wheel half shown in FIG. 1 with venting channels according to various embodiments of present disclosure.
Figure 3:
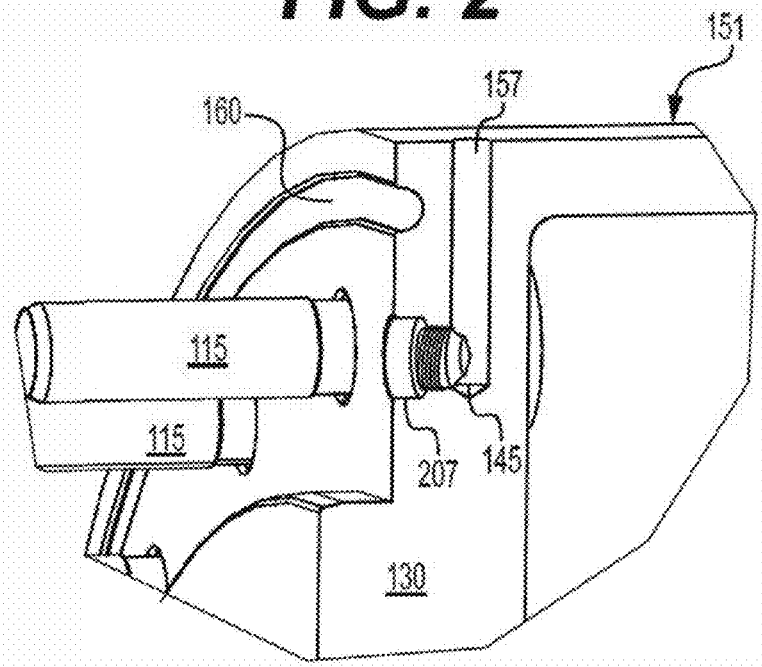
FIG. 3 illustrates a detailed view of a venting channel of a section of the inner wheel half shown in FIG. 2 according to various embodiments of present disclosure.

As shown in FIG. 2, the inner wheel half 103 can provide a valve stem threaded seat 145 and at least one cross-vent threaded seat 148. In any one or more embodiments herein, the valve stem threaded seat 145 and the at least one cross-vent threaded seat 148 can be configured to be the same dimensions and thread size to receive either a valve stem 121 or a venting port plug 124. The valve stem threaded seat 145 and the at least one cross-vent threaded seat 148 are formed in the first wheel disc 130 and positioned at substantially the same radius outwardly from axis X as the first clamping holes 142. The valve stem threaded seat 145 and the at least one cross-vent threaded seat 148 can be fluidly connected to the at least one respective radial vent port 157, also shown in FIG. 3.

A primary o-ring 112 can be seated within the annular groove 160 in the inner wheel half 103. A plurality of clamping bolts 115 can be inserted in the plurality of first clamping holes 142 positioned such that the shafts of the clamping bolts 115 project in axial direction X outwardly from the first seating surface 133 of the first wheel disc 130 of the inner wheel half 103.

Figure 4:
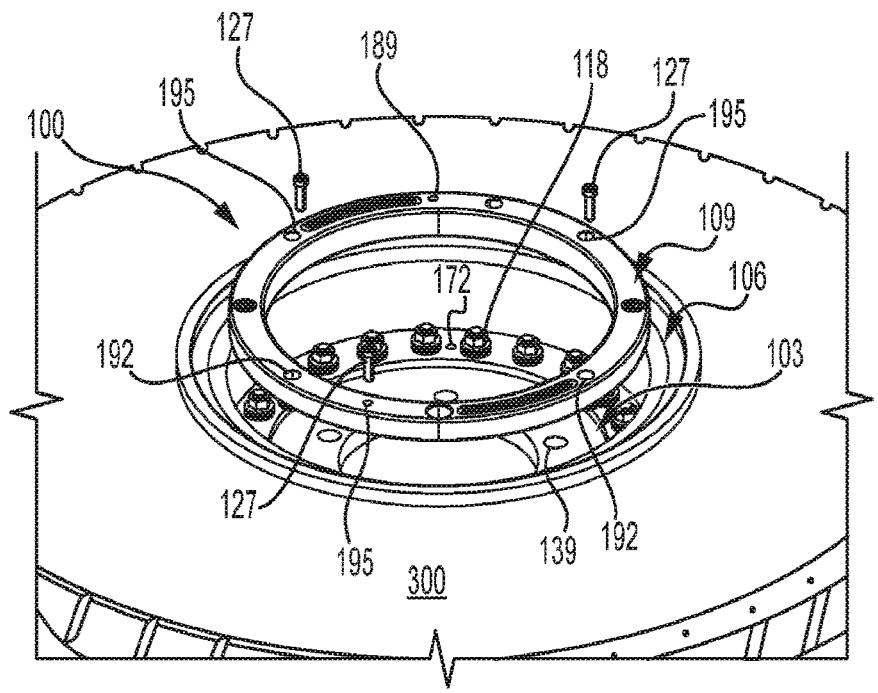
FIG. 4 illustrates the positioning of the bolt cover ring to align the cap screw holes of the wheel assembly shown in FIG. 1 with a tire installed according to various embodiments of present disclosure.

As shown in FIG. 4, a tubeless tire 300 can be placed on the inner wheel half 103, preferably orienting the inner wheel half 103 with the first seating surface 133 facing up for stability. After aligning at least one cross-vent hole 178 of an outer wheel half 106 with an axial portion of the at least one cross-vent threaded seat 148 of the inner wheel half 103 and aligning a plurality of second clamping holes 172 in the outer wheel half 106 with the plurality of clamping bolts 115 projecting from the inner wheel half 103, the outer wheel half 106 can be secured to the inner wheel half 103 using wheel clamping bolts 115. The outer wheel half 106 can be secured to the inner wheel half 103 with a plurality of clamping nuts 118. The clamping nuts 118 can be tightened on the plurality of clamping bolts 115 projecting from the inner wheel half 103.

Figure 5:
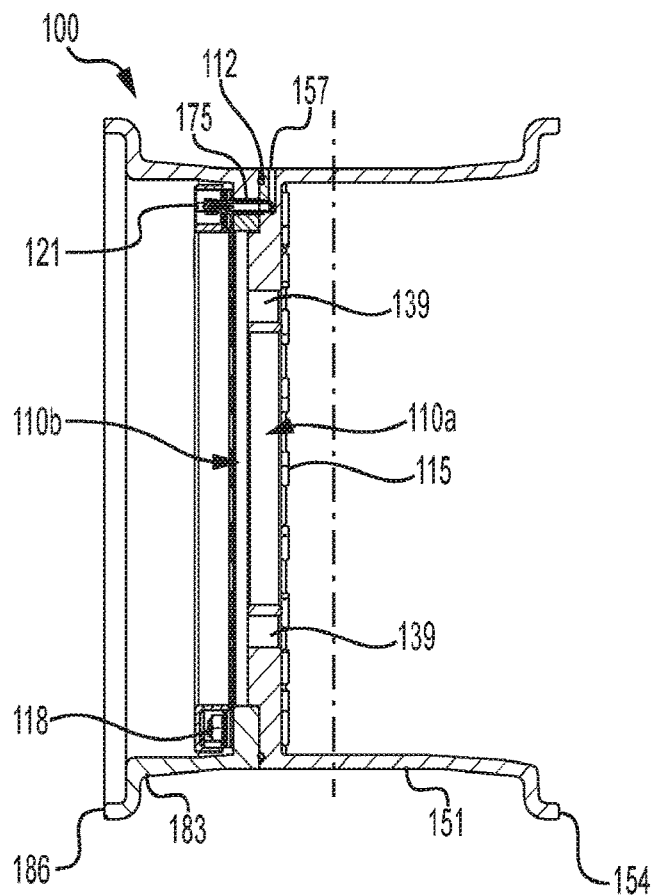
FIG. 5 illustrates a section view of the wheel assembly along the line shown in FIG. 7 according to various embodiments of present disclosure.

Turning to FIG. 5, details of the wheel assembly 100 are shown in a section view. As shown, in any one or more aspects, the first wheel base portion 151 is substantially wider in the direction along axis X than the second wheel base portion 183 to facilitate assembly. The vent port 157 is shown with the valve stem 121 seated in the inner wheel half 103. The primary o-ring 112 is shown between the first seating surface 133 and the second seating surface 166 for providing an air seal between the two halves once they are secured or clamped together. The bolt cover ring 109 is installed to cover the clamping bolts 115 associated and clamping nuts 118. In an embodiment, the arrangement of valve stem, venting port plugs, and cap screw angular locations allow for only one orientation of the inner and outer wheel halves as well as the bolt cover.

Figure 6:
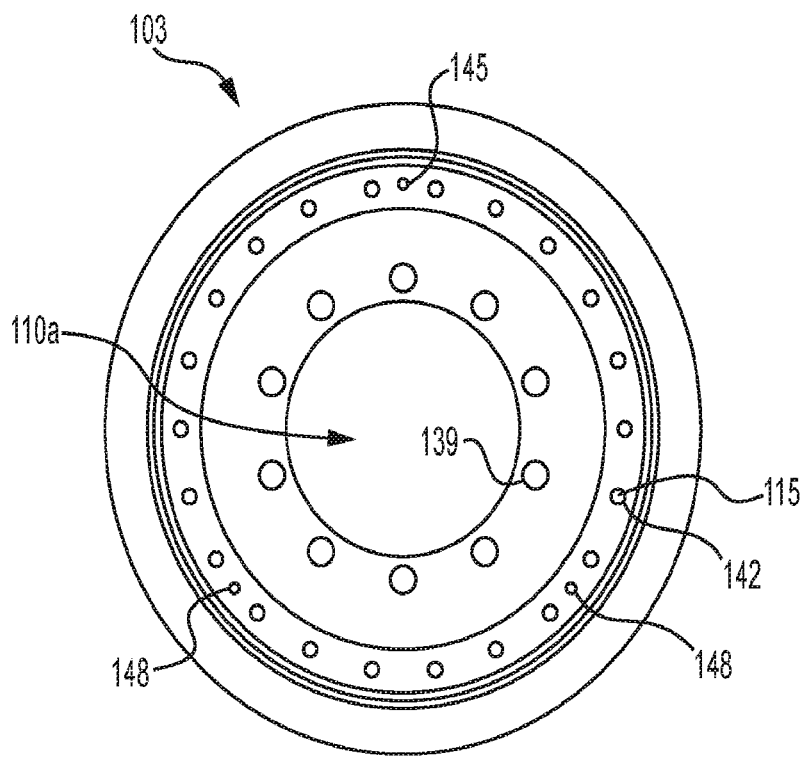
FIG. 6 illustrates a side view of the inner wheel half shown in FIG. 1 according to various embodiments of present disclosure.
Figure 7:
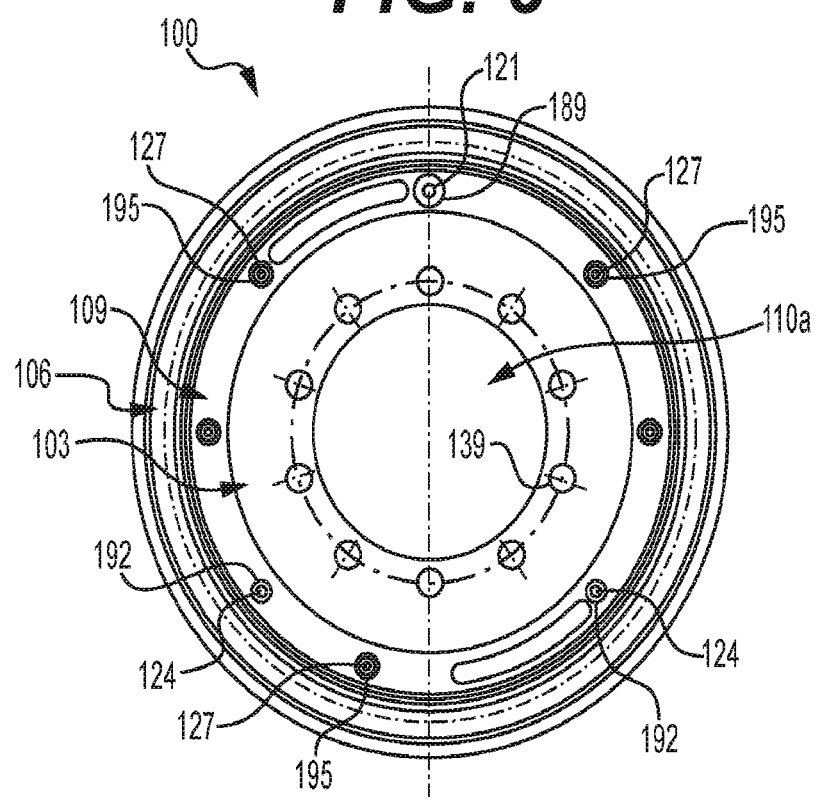
FIG. 7 illustrates a side view of the wheel assembly shown in FIG. 1 including an attached bolt cover ring according to various embodiments of present disclosure.

Next, FIGS. 6 and 7 illustrate the relative positioning of the valve stem threaded seat 145 and at least one cross-vent threaded seat 148 on the inner wheel half 103 (FIG. 6) and the assembled wheel with the deflation system installed (FIG. 7). The bolt cover ring 109 comprises a valve stem access hole 189, at least one venting port plug access hole or seat 192, and at least one cap screw seat 195. In any one or more aspects, the valve stem access hole 189, the at least one venting port plug access hole or seat 192, and the at least one cap screw seat 195 can be positioned asymmetrically so that there is only one way to orient and install the bolt cover ring 109, as shown in FIG. 7. The bolt cover ring can include one or more warning messages or instructions molded in place in its outer surface.

The bolt cover ring 109 can be installed by aligning a valve stem access hole 189 of a bolt cover ring 109 with a valve stem threaded seat 145 configured to receive the removable valve stem 121. The bolt cover ring 109 can be secured to the outer wheel half 106 over the plurality of clamping nuts 118 with the cap screws 127. The removable valve stem 121 can be inserted through the valve stem hole 189 of the bolt cover ring 109, through the valve stem hole 175 of the second wheel disc 163 of the outer wheel half 106, and secured within the valve stem threaded seat 145 formed in the inner wheel half 103. The venting port plugs 124 can be secured to the inner wheel half 103 and inserted through a venting port plug access hole or seat 192 of the bolt cover ring 109 and the cross-vent hole 178 in the outer wheel half 106. The tire 300 can be inflated using the removable valve stem 121.

Figure 8A:
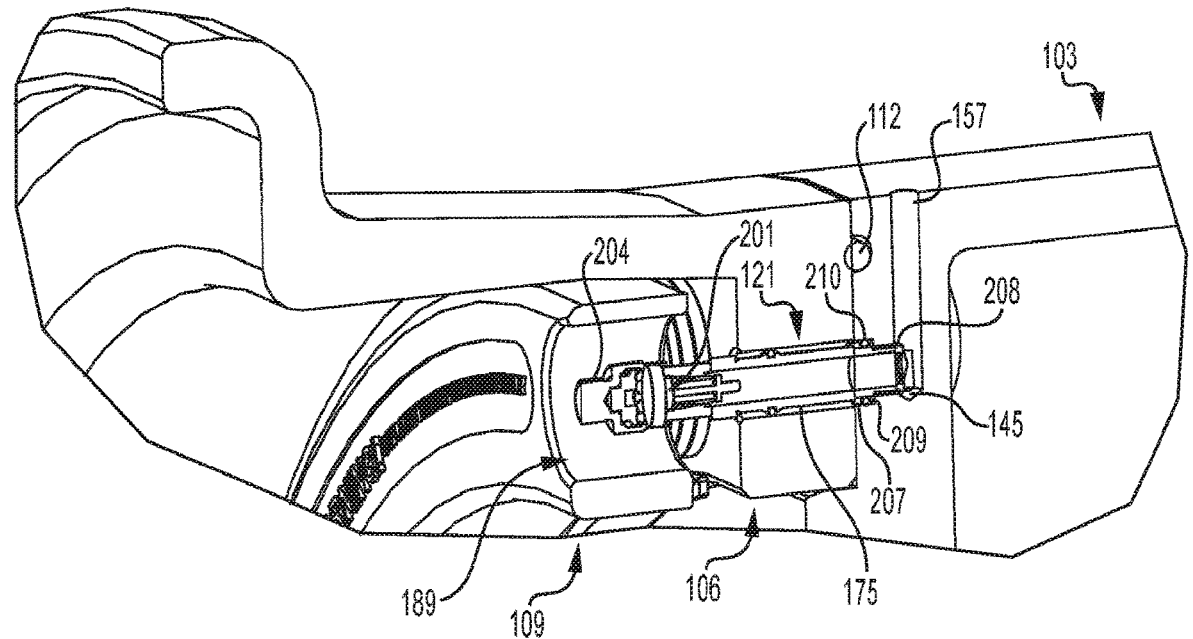
FIG. 8A illustrates a detailed section view of an exemplary valve stem assembled within the wheel assembly according to various embodiments of present disclosure.

FIG. 8A is an example of the placement of the removable valve stem 121 in the wheel assembly 100. The removable valve stem 121 can include a valve core 201 and valve cap 204. The removable valve stem 121 can have a threaded portion 211 configured to be received and threaded into the valve stem threaded seat 145, providing a seal with the inner wheel half only 103. The valve stem threaded seat 145 can have an unthreaded portion 207 that is greater than or equal in diameter to the threaded portion 208. An unthreaded portion 207 can provide a positive stop surface 209 for the removable valve stem 121 so that it does not obstruct the vent port 157. Similarly, the removable valve stem 121 can have a sealing face 212 formed in the body of the valve stem and configured to abut the positive stop surface 209 of the unthreaded portion 207 of the valve seat 145, inhibiting the flow of air.

A valve o-ring 210 can be provided and disposed within a valve groove 213 to provide an airtight seal for the vent channel. The valve o-ring 210 can be secured to the valve stem 121 at a position behind but not at the location of the threads 208 of the threaded valve seat 145. The valve o-ring 210 can be configured to provide an airtight seal with the sealing surface of the unthreaded portion 207 of the valve stem threaded seat 145. The fastener threads and sealing feature can be incorporated in the inner wheel half 103, independent from the outer wheel half 106.

Figure 8B:
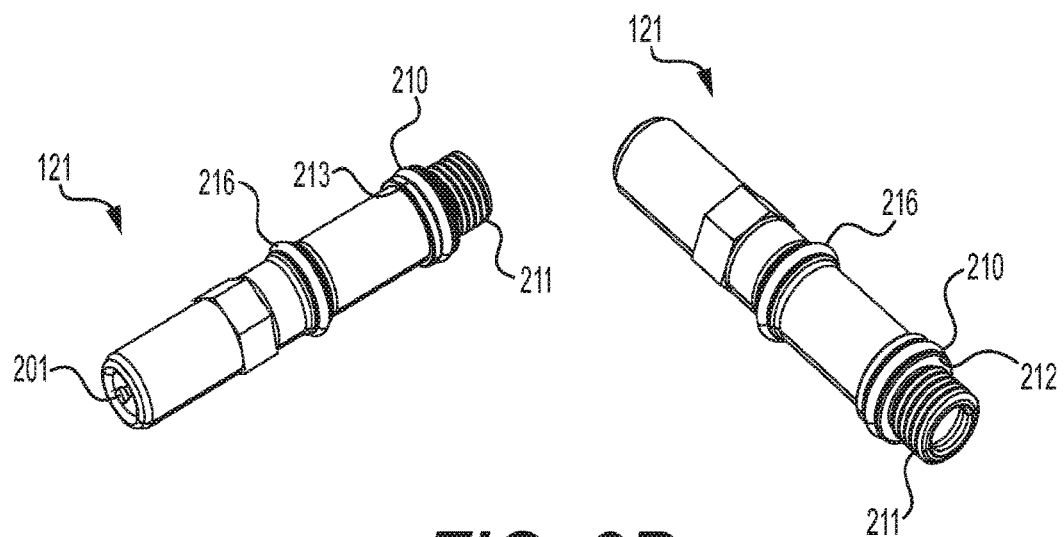
FIG. 8B illustrates front and back views of an exemplary valve stem according to various embodiments of present disclosure.

In any one or more aspects, vent port 157 is provided to fluidly mate with a distal end of valve stem hole 175 at valve stem seat 145 and can extend radially outwardly (from axis X), substantially perpendicularly, from the distal end of valve stem hole 175. The valve stem hole 175 in the outer wheel half 106 can be configured with a clearance around the removable valve stem 121 to allow for vibrations during operation of the vehicle. An annular soft spacer 216, such as a second o-ring, can be provided to surround a portion of the removable valve stem 121 positioned in the valve hole 175 in the outer wheel half 106 to support the removable valve stem 121 and eliminate "rattle" or noise from vibrations. The valve stem access hole 189 in the bolt cover ring 109 provides clearance around the removable valve stem 121 for removal of valve cap 204 and service access. FIG. 8B illustrates front and rear views of a removable valve stem 121.

Figure 9A:
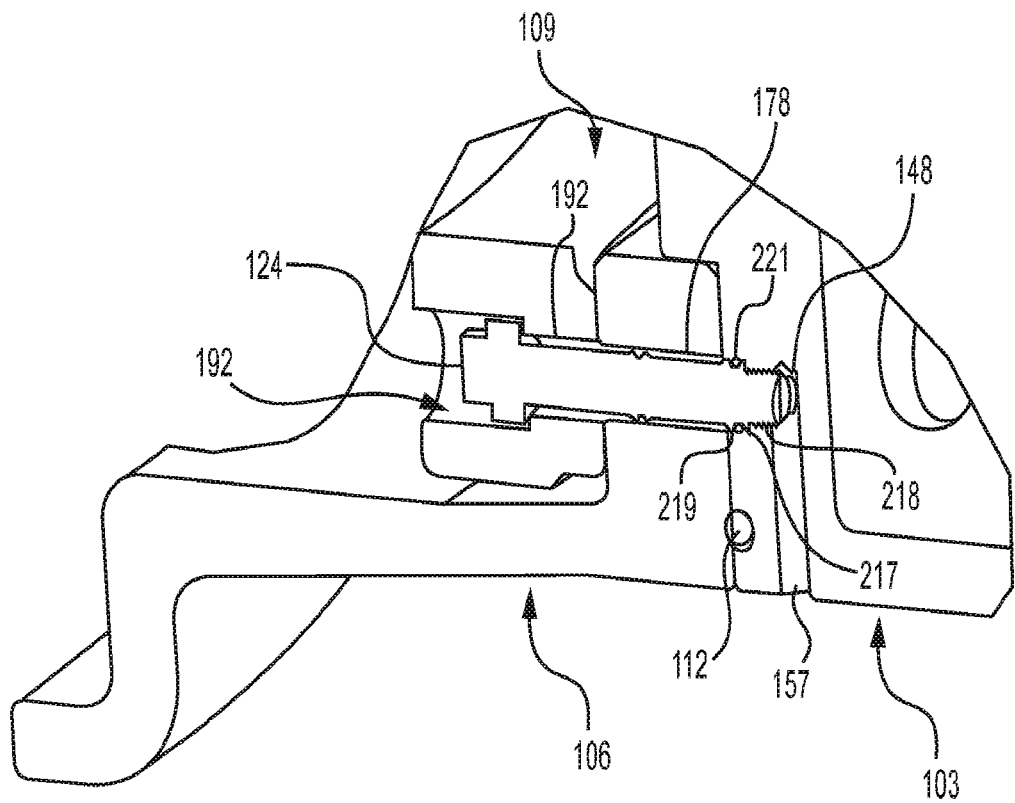
FIG. 9A illustrates a detailed section view of an exemplary venting port plug assembled within the wheel assembly according to various embodiments of present disclosure.

Next, FIG. 9A illustrates an example of the placement of a venting port plug 124 in the wheel assembly 100. The venting port plug 124 having a threaded portion 222 (shown in FIG. 9B) configured to be received in a cross-vent threaded seat 148, providing a seal within only the inner wheel half 103. A cross-vent threaded seat 148 can have an unthreaded portion 219 that is greater than or equal in diameter to the threaded portion 218. An unthreaded portion 219 can provide a positive stop surface 217 for the venting port plug 124 so that it does not obstruct the vent port 157. Similarly, the venting port plug 124 can have a sealing face 223 formed in the body of the venting port plug 124 and configured to abut the positive stop surface 217 of the unthreaded portion 219 of the cross-vent seat 148, inhibiting the flow of air.

A bolt o-ring 221 can be provided and disposed in a bolt groove 224 to provide an airtight seal for the vent channel. The bolt o-ring 221 can be secured to the venting port plug 124 at a position behind but not at the location of the threads 218. The bolt o-ring 221 can be configured to provide an airtight connection with the sealing surface of the unthreaded portion 219 of the cross vent threaded seat 148.

The fastener threads and sealing feature can be incorporated in the inner wheel half 103, independent from the outer wheel half 106. In any one or more aspects, vent port 157 is provided to fluidly mate with a distal end of cross-vent hole 178 at cross-vent threaded seat 148 and can extend radially outwardly (from axis X), substantially perpendicularly, from the distal end of cross-vent hole 178. The cross-vent hole 178 in the outer wheel half 106 can be configured with a clearance around the venting port plug 124 to allow for vibrations during operation of the vehicle. An annular soft spacer 227, such as a second o-ring can be provided to surround a portion of the venting port plug 124 positioned in the cross-vent hole 178 in the outer wheel half 106 to support the venting port plug 124 and eliminate "rattle" or noise from vibrations. In any one or more aspects, the annular soft spacer 227 can be positioned at the seam where the bolt cover ring 109 meets the outer wheel half 106. The venting port plug access hole or seat 192 in the bolt cover ring 109 is configured to accommodate the bolt head and mate with the shoulder of the venting port plug 124.

Figure 9B:
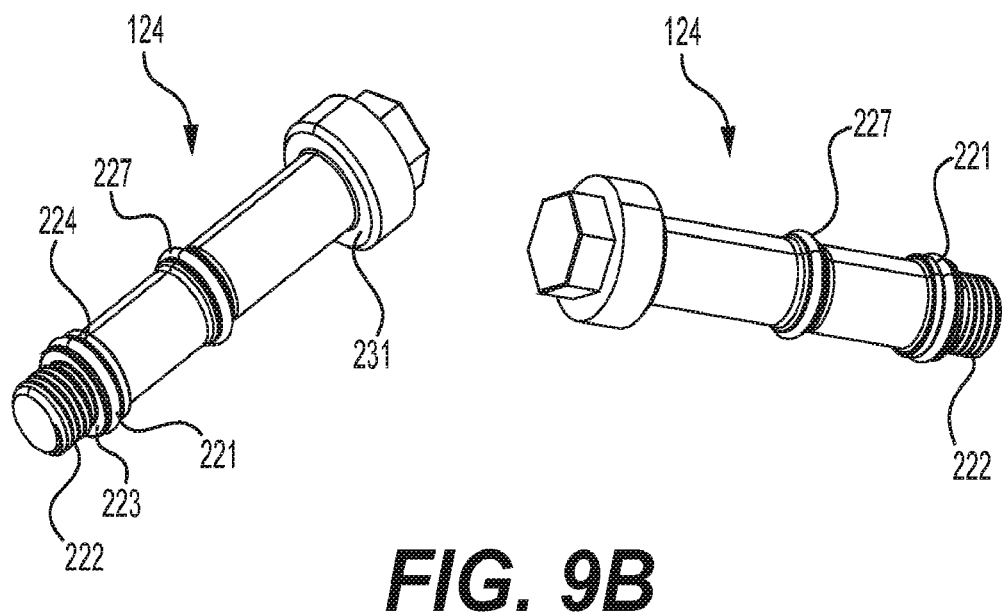
FIG. 9B illustrates front and back views of an exemplary venting port plug according to various embodiments of present disclosure.

FIG. 9B illustrates front and rear views of a venting port plug 124. In any one or more aspects, the venting port plug 124 can include a shoulder 231 to prevent the bolt cover ring 109 from being removed while the venting port plug 124 is secured in place within threaded seat 148.

Figure 10:
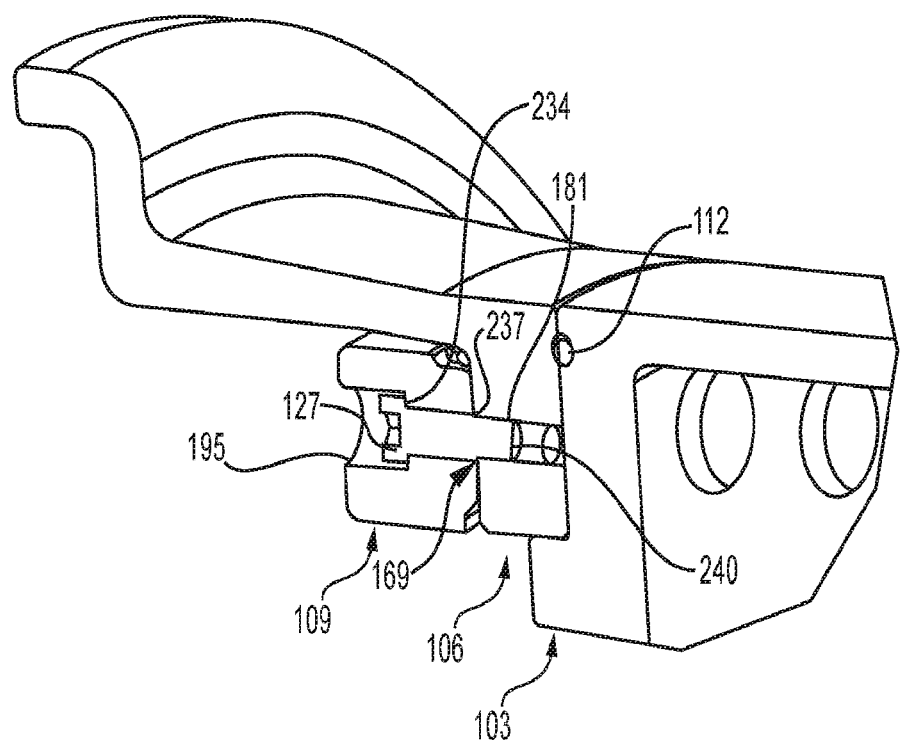
FIG. 10 illustrates an enlarged view of an exemplary cap screw assembled within the wheel assembly according to various embodiments of present disclosure.

Shown in FIG. 10 is an example of the placement of a cap screw 127 that secures the bolt cover ring 109 in the outer wheel half 106 of the wheel assembly 100. The cap screw 127 can be inserted through the cap screw seat 195 of the bolt cover ring 109 and secured to the cap screw threaded seat 181 in the outer wheel half. The cap screw seat 195 can provide a positive stop for tightening. The bolt cover ring 109 can provide a solid boss for the cap screw 127 such that the bolt cover ring 109 will not crack from excessive torque applied to the cap screw 127. In an embodiment, the cap screw 127 can have a shoulder 234 at the cap end that mates with the bolt cover ring 109 and a second shoulder 237 towards the threaded end 240 that mates with the outer surface 169 of the outer wheel half 106 creating a fixed distance between the two shoulders that prevents over-tightening of the cap screw 127 against the bolt cover ring 109. The second shoulder 237 towards the threaded end 240 of the cap screw 127 provides a stop that limits how far the cap screw 127 can be threaded into the cap screw threaded seat 181 and thus prevents over-tightening and ultimately cracking of the bolt cover ring 109, if the second shoulder 237 were not present.

Figure 11:
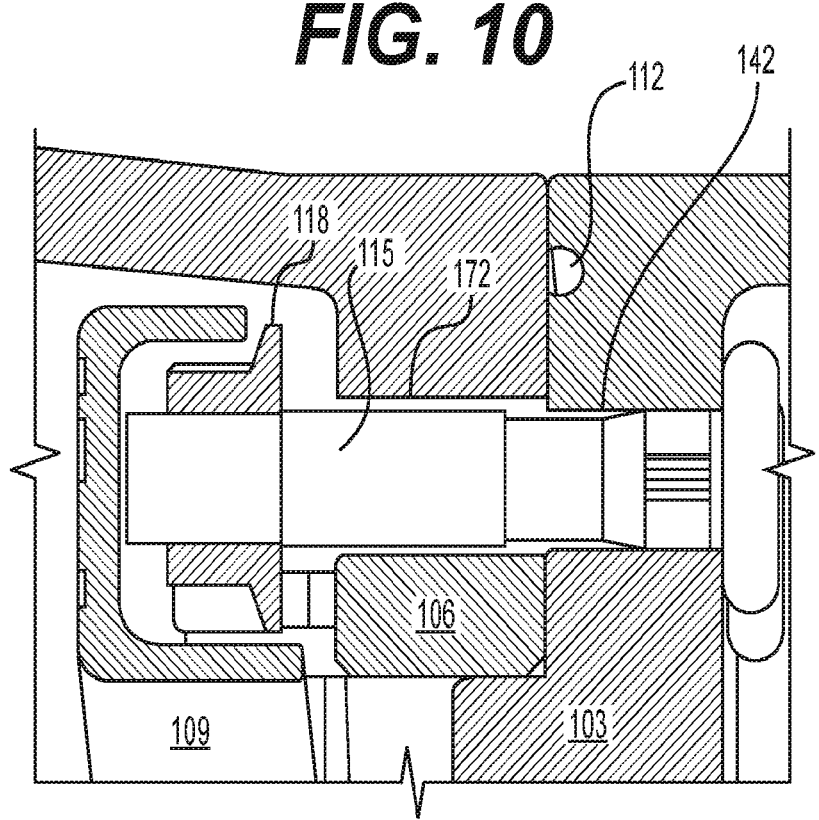
FIG. 11 illustrates an enlarged view of an exemplary clamping bolt with clamping nut assembled within the wheel assembly according to various embodiments of present disclosure.

Illustrated in FIG. 11 is an example of a clamping bolt 115 secured with a clamping nut 118 passing through a first clamping hole 142 in the inner wheel half 103 and a second clamping hole 172 of the outer wheel half 106. In any one or more aspects, the clamping nut 118 can be a 3-piece style flange nut. The bolt cover ring 109 can be configured to accommodate the profile of the clamping nut 118. In any one or more aspects, the depth of the bolt cover ring 109 can be greater on inner diameter than on the outer diameter to fit the dimensions of the outer wheel half 106.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A wheel assembly comprising:
    an inner wheel half comprising:
        a first wheel disc having a first seating surface, the first wheel disc having a center aperture in an axial direction, a plurality of mounting holes at a first radial position outwardly from the center aperture surrounding the center aperture, a plurality of first clamping holes at a second radial position outwardly from the center aperture, a valve stem threaded seat, at least one threaded cross-vent seat, and
        a first wheel base portion having a substantially cylindrical outer peripheral surface extending along the axial direction from the first wheel disc to a peripheral edge forming a first annular rim, the first wheel base portion having at least one vent port extending in a radial direction from the axial direction of the center aperture through the substantially cylindrical outer peripheral surface into the first wheel disc and intersecting with the at least one threaded cross-vent seat in the first wheel disc;
    an outer wheel half comprising:
        a second wheel disc having a second seating surface configured to mate with the first seating surface of the inner wheel half and an opposing surface configured to mate with a bolt cover ring, the second wheel disc having a center opening configured to provide access clearance around the plurality of mounting holes in the first wheel disc, a plurality of second clamping holes configured to mate and correspond with the plurality of first clamping holes, a valve stem hole configured to mate and correspond with the valve stem threaded seat of the first wheel disc, and at least one cross-vent hole configured to mate and correspond with the at least one threaded cross-vent seat, and at least one cap screw threaded seat formed in the opposing surface configured to mate with the bolt cover ring, and
        a second wheel base portion having the substantially cylindrical outer peripheral surface extending along the axial direction from the second wheel disc to an outer annular rim;
    the bolt cover ring comprising a valve stem aperture, at least one venting port plug access hole, and at least one cap screw seat; and
    a removable valve stem comprising a valve core and a valve cap.

2. The wheel assembly of claim 1, further comprising an annular groove disposed circumferentially around an annular edge of the first seating surface of the first wheel disc, and an o-ring disposed in the annular groove.

3. The wheel assembly of claim 1, further comprising a plurality of clamping bolts, a plurality of clamping nuts, at least one venting port plug, and at least one cap screw.

4. The wheel assembly of claim 1, wherein the first wheel base portion is substantially wider that the second wheel base portion.

5. The wheel assembly of claim 1, wherein a valve stem port comprises the valve stem threaded seat of the inner wheel half, the valve stem hole of the outer wheel half, and the valve stem aperture of the bolt cover ring, the valve stem threaded seat intersecting with one of the at least one vent port and configured to provide fluid passage through the valve stem port through the vent port to inflate or deflate a tire, the removable valve stem having a threaded end and secured to the inner wheel half when seated in the threaded valve stem seat.

6. The wheel assembly of claim 5, wherein the valve stem threaded seat further comprises an unthreaded portion with a radius greater than a threaded portion of the valve stem threaded seat and is configured to provide a positive stop for tightening the removable valve stem that can provide an air seal surface.

7. The wheel assembly of claim 6, wherein the removable valve stem further comprises an o-ring seated behind a threaded portion configured to seal a gap between the removable valve stem and the unthreaded portion of the valve stem threaded seat and an annular soft spacer configured to support the removable valve stem within the valve stem hole in the outer wheel half.

8. The wheel assembly of claim 1, wherein the at least one threaded cross-vent seat comprises a threaded portion and a wider unthreaded portion configured as a positive stop for tightening at least one venting port plug.

9. The wheel assembly of claim 8, wherein the at least one venting port plug further comprises an o-ring seated behind a threaded portion configured to seal a gap between the at least one venting port plug and the unthreaded portion of the at least one threaded cross-vent seat, and an annular soft spacer configured to support the at least one venting port plug within the at least one cross-vent hole in the outer wheel half.

10. The wheel assembly of claim 1, wherein the at least one cap screw seat and the at least one venting port plug access hole or seat of the bolt cover ring are positioned asymmetrically with respect to the valve stem aperture.

11. A deflation system for a tubeless tire, the deflation system comprising:
    a plurality of vent channels formed within a wheel assembly, the wheel assembly comprising an inner wheel half configured to face a vehicle and an outer wheel half configured to face away from the vehicle, each vent channel comprising an axial portion and a radial portion, the axial portion of each vent channel comprising a through hole in the outer wheel half extending in a direction axially from a side of the outer wheel half configured to face a vehicle to an opposite side of the outer wheel half configured to face away from the vehicle, and the radial portion of each vent channel in the inner wheel half extending radially outwardly from the axial direction;
    a removable valve stem comprising a valve core and a valve cap, the removable valve stem having a threaded end, wherein one of the plurality of vent channels further comprises a valve stem seat formed in the inner wheel half to receive the threaded end of the removable valve stem;
    at least one venting port plug having a threaded end, wherein at least one of the plurality of vent channels further comprises a cross-vent threaded seat formed in the inner wheel half to receive and secure the at least one venting port plug;
    a bolt cover ring configured to cover a plurality of clamping bolts that fasten the outer wheel half to the inner wheel half, the bolt cover ring comprising an access aperture for the removable valve stem, at least one venting port plug access hole, and at least one cap screw seat; and
    at least one cap screw configured to attach the bolt cover ring to the outer wheel half.

12. The deflation system of claim 11, wherein the removable valve stem further comprises an o-ring and a soft spacer configured to form an air seal within the vent channel corresponding to the valve stem seat.

13. The deflation system of claim 11, wherein the at least one venting port plug further comprises an o-ring and a soft spacer configured to form an air seal within the corresponding at least one vent channel.

14. The deflation system of claim 11, wherein air, if present, is released from the tubeless tire when the at least one venting port plug is removed.

15. The deflation system of claim 11, wherein the at least one venting port plug and the bolt cover ring block access to the plurality of clamping bolts.

16. A method for assembling a wheel for a tubeless tire, comprising:

installing a plurality of clamping bolts in a plurality of corresponding seats in an inner wheel half of the wheel assembly, wherein the plurality of clamping bolts project from a first seating surface of the inner wheel half;

placing the tubeless tire on the inner wheel half, the tubeless tire surrounding a wheel base portion having a first vent channel configured to receive a removable valve stem and a second vent channel configured to receive a venting port plug;

aligning at least one vent aperture of an outer wheel half with an axial portion of the at least one vent channel of the inner wheel half and aligning a plurality of bolt holes in the outer wheel half with the plurality of clamping bolts projecting from the inner wheel half;

securing the outer wheel half to the inner wheel half with a plurality of clamping nuts, wherein the clamping nuts are tightened on the plurality of clamping bolts projected from the inner wheel half;

aligning an access hole of a bolt cover ring with the vent channel configured to receive the removable valve stem;

securing the bolt cover ring over the clamping nuts;

installing the removable valve stem in the first vent channel configured to receive the removable valve stem by securing the removable valve stem to the inner wheel half;

installing the venting port plug in the second vent channel configured to receive the venting port plug, by securing the venting port plug to the inner wheel half; and inflating the tubeless tire via the removable valve stem.

\* \* \* \* \*